(12) United States Patent
Sato et al.

(10) Patent No.: US 9,739,314 B2
(45) Date of Patent: Aug. 22, 2017

(54) BEARING UNIT AND MOTOR

(71) Applicant: Shinano Kenshi Kabushiki Kaisha, Ueda-shi, Nagano (JP)

(72) Inventors: Junki Sato, Ueda (JP); Takeshi Miyasaka, Ueda (JP)

(73) Assignee: SHINANO KENSHI KABUSHIKI KAISHA, Ueda-Shi, Nagano (JP)

( * ) Notice: Subject to any disclaimer, the term of this patent is extended or adjusted under 35 U.S.C. 154(b) by 280 days.

(21) Appl. No.: 14/753,176

(22) Filed: Jun. 29, 2015

(65) Prior Publication Data

US 2015/0377300 A1 Dec. 31, 2015

(30) Foreign Application Priority Data

Jun. 30, 2014 (JP) ................. 2014-134919

(51) Int. Cl.
| | |
|---|---|
| *F16C 35/02* | (2006.01) |
| *H02K 5/167* | (2006.01) |
| *H02K 5/16* | (2006.01) |
| *H02K 5/15* | (2006.01) |
| *F16C 17/02* | (2006.01) |
| *F16C 33/08* | (2006.01) |
| *F16C 33/10* | (2006.01) |

(52) U.S. Cl.
CPC ............. *F16C 35/02* (2013.01); *H02K 5/15* (2013.01); *H02K 5/16* (2013.01); *H02K 5/1675* (2013.01); *F16C 17/02* (2013.01); *F16C 33/08* (2013.01); *F16C 33/104* (2013.01); *F16C 2360/46* (2013.01)

(58) Field of Classification Search
CPC ........ F16C 33/06; F16C 33/08; F16C 33/104; F16C 35/02; H02K 5/15–5/1677
See application file for complete search history.

(56) References Cited

U.S. PATENT DOCUMENTS

| | | | | |
|---|---|---|---|---|
| 5,363,003 A | * | 11/1994 | Harada | ........... H02K 1/187 |
| | | | | 310/216.118 |
| 2002/0130570 A1 | * | 9/2002 | Howe | ........... H02K 5/08 |
| | | | | 310/89 |

FOREIGN PATENT DOCUMENTS

JP 5039491 4/2009

* cited by examiner

*Primary Examiner* — Ramon M Barrera
(74) *Attorney, Agent, or Firm* — Stephen J. Weyer, Esq.; Stites & Harbison, PLLC

(57) ABSTRACT

The bearing unit comprises: a bearing housing being formed into a cylindrical shape; and a bearing section being attached in the bearing housing. The bearing housing is made of resin. Grooves and projecting stripes are formed in an inner circumferential face of a housing hole of the bearing housing and an outer circumferential face of the bearing section, and they are extended in an axial direction. The bearing section is fitted into the bearing housing from an opening part of the bearing housing, in a state where the grooves and the projecting stripes are corresponded to each other, until the bearing section contacts an inner end face of the housing hole. A retaining projection of the bearing housing, which is formed at one end of the housing hole located on the one end side of the bearing housing, is deformed to overlap an end face of the bearing section.

7 Claims, 4 Drawing Sheets

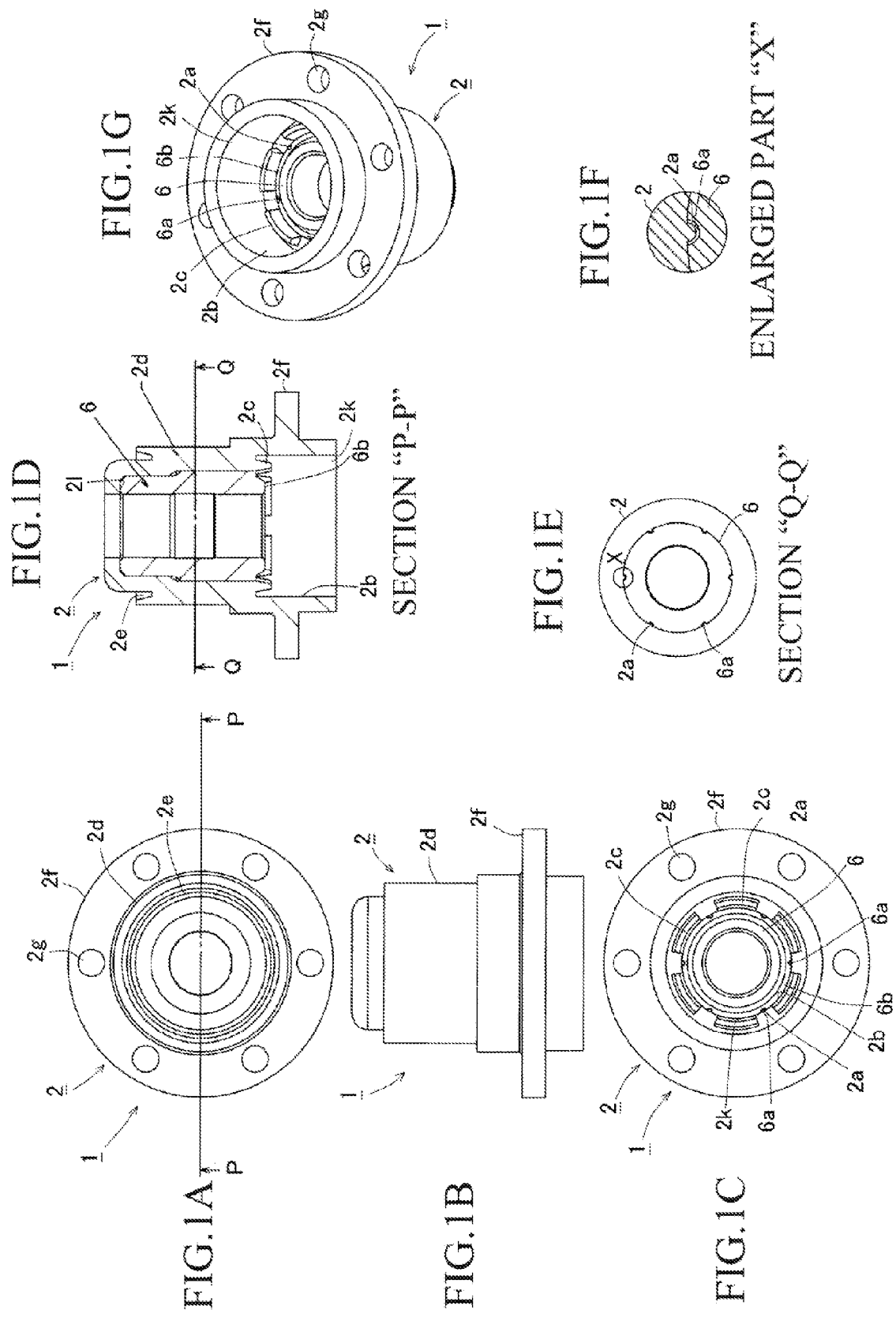

SECTION "R-R"

SECTION "S-S"

BEARING UNIT AND MOTOR

CROSS-REFERENCE TO RELATED APPLICATION

This application is based upon and claims the benefit of priority of the prior Japanese Patent Application No. 2014-134919, filed on Jun. 30, 2014, and the entire contents of which are incorporated herein by reference.

FIELD

The present invention relates to a bearing unit, which is capable of rotatably holding, for example, a rotor, and a motor having said bearing unit.

BACKGROUND

Conventionally, a bearing is used to rotatably hold a rotor shaft of a rotor, and a stator housing is used to fix the bearing in a stator. The bearing is provided in a cylindrical member of the stator housing so as to rotatably hold the rotor shaft, and a stator core is attached on an outer circumferential face of the cylindrical member.

The stator housing is made of suitable metal, e.g., brass, which can be easily processed and formed into various shapes. A sintered bearing is press-fitted into the stator housing, and the stator core is fitted on an outer circumferential face thereof and fixed by an adhesive.

On the other hand, some stator housings are not made of metal, e.g., brass, and they are made of resin so as to reduce production cost. To prevent the bearing from being moved in an axial direction with respect to the stator housing, a bearing structure, in which a retainer for prohibiting the bearing to move in the axial direction is provided to one end of the stator housing, has been invented (see Patent Document 1).

PRIOR ART DOCUMENTS

Patent Document 1: Japanese Patent No. 5039491

However, in the above described stator housing made of resin, internal distortion will be easily generated in the stator housing when the bearing is press-fitted, so a post-process of rotary sizing must be required. Further, the retainer must be fitted after press-fitting the bearing, but the retainer prohibits the bearing to move in the axial direction only. Cracks will be generated in the stator housing made of resin and a power for holding the press-fitted bearing in the stator housing will be reduced by heat shock, etc., so the bearing will be slightly turned in the stator housing while rotating a motor. Therefore, assembling accuracy of the bearing and the stator housing will be lowered. Further, if the bearing is fitted with play, the bearing must be rotated and the assembling accuracy must be lowered.

SUMMARY

The present invention has been invented to solve the above described problems of the conventional technologies.

Accordingly, it is an object in one aspect of the invention to provide a bearing unit, which is capable of prohibiting rotation of a metallic bearing section with respect to a bearing housing made of resin, improving an assembling accuracy of the bearing unit and reducing production cost thereof, and a motor which has said bearing unit, whose production cost can be reduced and whose assembling accuracy can be increased.

To achieve the object, the present invention has following structures.

Namely, the bearing unit of the present invention comprises:

a bearing housing being formed into a cylindrical shape; and a bearing section being attached in the bearing housing, the bearing housing being capable of rotatably holding a rotor shaft, the bearing housing is made of resin, grooves and projecting stripes, which are engaged with each other, are formed in an inner circumferential face of a housing hole of the bearing housing and an outer circumferential face of the bearing section and extended in an axial direction of the bearing housing and the bearing section, the bearing section is fitted into the bearing housing from an opening part which is located on one end side of the bearing housing, in a state where the grooves and the projecting stripes are corresponded to each other, until the bearing section contacts an inner end face of the housing hole which is located on the other end side of the bearing housing, and a retaining projection of the bearing housing, which is formed at one end of the housing hole located on the one end side of the bearing housing, is deformed to overlap an end face of the bearing section.

With this structure, the bearing housing is made of resin, so that production cost of the bearing unit can be reduced. The bearing section is fitted into the bearing housing from the opening part which is located on one end side of the bearing housing, in the state where the grooves and the projecting stripes are corresponded to each other, until the bearing section contacts the inner end face of the housing hole, so that the bearing section can be attached in the bearing housing and rotation of the bearing section can be prohibited without being press-fitted. Because the bearing section can be attached in the bearing housing without being press-fitted, an inner diameter of the bearing section is not changed by distortion, so that the post-process of rotary sizing can be omitted.

Further, the retaining projection of the bearing housing, which is formed at one end of the housing hole located on the one end side of the bearing housing, is deformed to overlap the end face of the bearing section, so that the bearing section can be retained and prohibited to move in the axial direction. Therefore, the bearing section can be highly accurately assembled in the bearing housing made of resin without deformation caused by heat and press fit.

Preferably, the retaining projection is deformed by heat caulking. With this structure, the bearing section made of metal can be fixed and retained in the axial direction without using an adhesive.

Note that, the heat caulking is a caulking manner using any heating means, e.g., heat plate, ultrasonic wave means, infrared ray means, induction means. By performing the heat caulking, the heat generated by the heating means deforms the bearing housing for caulking.

Preferably, the projecting stripes are formed in the inner circumferential face of the bearing housing and extended in the axial direction thereof, and the grooves are formed in the outer circumferential face of the bearing section. The bearing housing may be produced by, for example, injection resin molding, and the bearing section, e.g., oil-impregnated sintered bearing, may be produced by a die set, so that concavo-convex shapes can be formed in their counter faces. Therefore, the bearing section can be easily attached into the bearing housing without press-fitting the bearing section. Further, by attaching the bearing section in the bearing housing, rotation of the bearing section can be securely prohibited.

Preferably, number of the grooves, which are formed in the outer circumferential face of the bearing section, is larger than that of the projecting stripes, which are formed in the inner circumferential face of the bearing housing. With this structure, working efficiency of fitting the bearing section into the bearing housing can be improved.

In the bearing unit, the bearing section may be made of metal, e.g., oil-impregnated sintered metal. In this case, the metallic bearing section can be accurately attached to the bearing housing made of resin without causing distortion to an inner diameter part of the bearing housing.

The motor of the present invention comprises:
the above described bearing unit of the present invention;
a stator core being attached on an outer circumferential face of the bearing housing; and
a rotor having a rotor shaft, which is rotatably held by the bearing section attached in the bearing housing.

With this structure, production cost of the motor can be reduced, and an assembling efficiency of the motor can be improved.

In the bearing unit of the present invention, the metallic bearing section can be highly accurately attached to the bearing housing made of resin, rotation of the bearing section with respect to the bearing housing can be prohibited, and the bearing section can be retained without moving in the axial direction. On the other hand, in the motor having the bearing unit of the present invention, production cost can be reduced, and an assembling efficiency can be improved. Therefore, the superior bearing unit and the superior motor can be provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Embodiments of the present invention will now be described by way of examples and with reference to the accompanying drawings which are given by way of illustration only, and thus are not limitative of the present invention, and in which:

FIG. 1A is a plan view of a bearing unit of an embodiment of the present invention;

FIG. 1B is a front view of the bearing unit;

FIG. 1C is a bottom view of the bearing unit;

FIG. 1D is a sectional view of the bearing unit taken along a line P-P;

FIG. 1E is a sectional view of the bearing unit taken along a line Q-Q;

FIG. 1F is an enlarged view of a part X;

FIG. 1G is a perspective view of the bearing unit;

DESCRIPTION OF THE EMBODIMENTS

Preferred embodiments of the bearing unit and the motor of the present invention will now be described in detail with reference to the accompanying drawings. Firstly, an outline of a blower including the motor of the present invention will be explained with reference to FIGS. 4A and 4B.

Figure 4A:
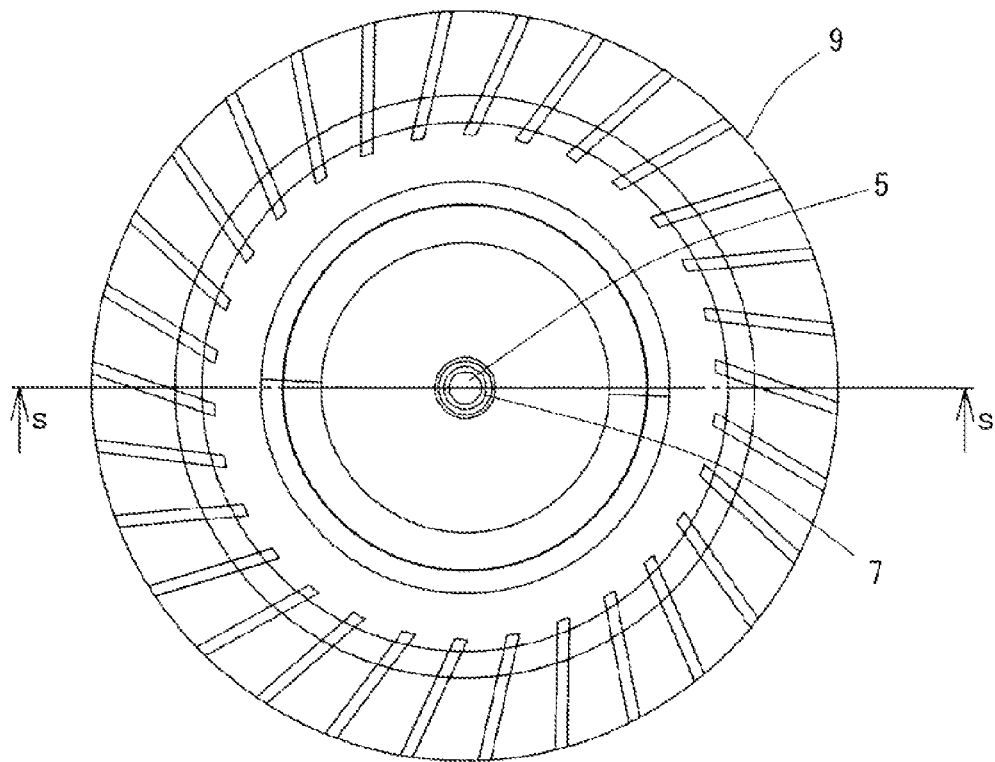
FIG. 4A is a plan view of a blower including a motor of the present invention.
Figure 4B:
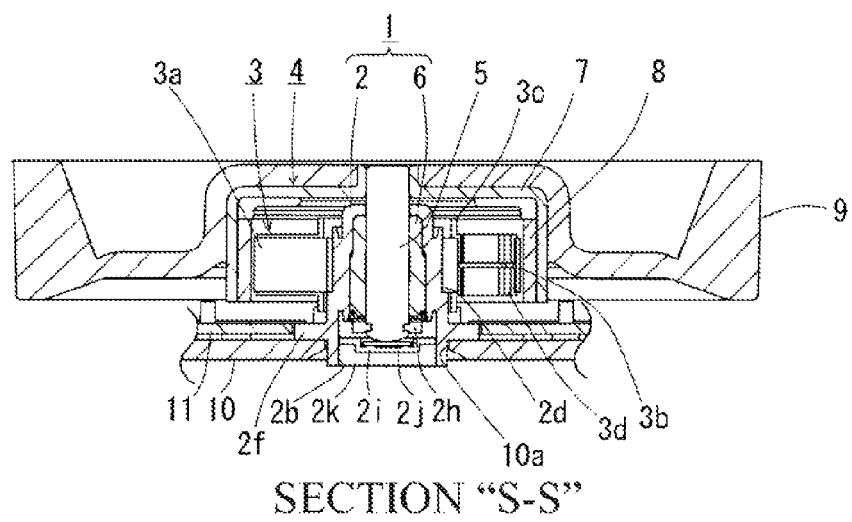
FIG. 4B is a sectional view of the blower taken along a line S-S.

In FIGS. 4A and 4B, a stator 3 is attached on an outer circumferential face of a bearing housing 2 of the bearing unit 1. A rotor shaft 5 of a rotor 4 is fitted in and rotatably held by a metallic bearing section 6, which is attached in the bearing housing 2 made of resin. The resin material of the bearing housing 2 has superior dimensional accuracy and can be injection-molded. Preferably, the resin material is poly phenylene sulfide (PPS) resin. The bearing section 6 is, for example, a slide bearing (oil-impregnated sintered bearing).

As shown in FIG. 4B, a rotor yoke 7 is integrated with one end part of the rotor shaft 5 by, for example, an adhesive, press fit, shrink fit, etc. The rotor yoke 7 is formed into a cup-shape having an opening part, and a ring-shaped rotor magnet 8 is fixed on an inner circumferential face of the rotor yoke 7. An impeller 9 is fitted on and integrated with an outer face of a top plate part of the rotor yoke 7 by press fit, an adhesive, etc. The impeller 4 shown in FIG. 4A generates vortex flow in a casing (not shown) of the blower so as to blow air.

As shown in FIG. 1D, the bearing unit 1 comprises: the bearing housing 2 being formed into a cylindrical shape and having a housing hole; and the metallic bearing section 6 being attached in the housing hole so as to rotatably hold the rotor shaft 5. For example, the metallic bearing section 6 (e.g., oil-impregnated sintered bearing) is fitted or lightly press-fitted in the bearing housing 2 made of PPS resin. Grooves 6a (see FIGS. 3A and 3B) are formed in an outer circumferential face of the bearing section 6 and extended in an axial direction thereof. On the other hand, projecting stripes 2a (see FIGS. 3C and 3D) are formed in an inner wall face (an inner circumferential face) 2b of the housing hole of the bearing housing 2 and extended in an axial direction thereof. A plurality of the grooves 6a and a plurality of the projecting stripes 2a, which are arranged in parallel in the circumferential direction and which are engaged with each other (see FIGS. 1C, 1E and 1F). The bearing housing 2 can be produced by, for example, injection resin molding, and the bearing section 6 (e.g., oil-impregnated sintered bearing) can be produced by a forming die set. Therefore, concavo-convex shapes can be formed in their counter faces. The oil-impregnated sintered bearing is produced by the steps of mixing metallic materials, shaping the mixed material, sintering the shaped material, sizing the sintered bearing, impregnating oil in the sintered bearing, etc. To attach the bearing section 6 in the bearing housing 2, the grooves 6a and the projecting stripes 2a are correctly positioned so as to correspond to each other, and then the bearing section 6 is fitted into the bearing housing 2 from one opening part 2k. Therefore, the bearing section 6 can be easily attached, without performing a press-fitting step. Further, by attaching the bearing section 6 in the bearing housing 2 in a state where the projecting stripes 2a respectively engage with the grooves 6a, rotation of the bearing section 6 can be securely prohibited.

Number of the grooves 6a, which are formed in the outer circumferential face of the bearing section 6, may be equal to number of the projecting stripes 2a (e.g., six), which are formed in the inner circumferential face 2b of the bearing housing 2. Preferably, the number of the grooves 6a (e.g., six) is larger than that of the projecting stripes 2a (e.g., three). In this case, an efficiency of attaching the bearing section 6 into the bearing housing 2 can be improved.

Figure 2A:
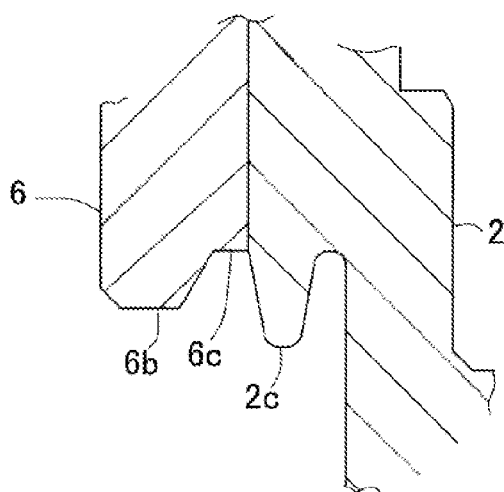
FIG. 2A is a partial sectional view of a retaining projection before caulking.
Figure 2B:
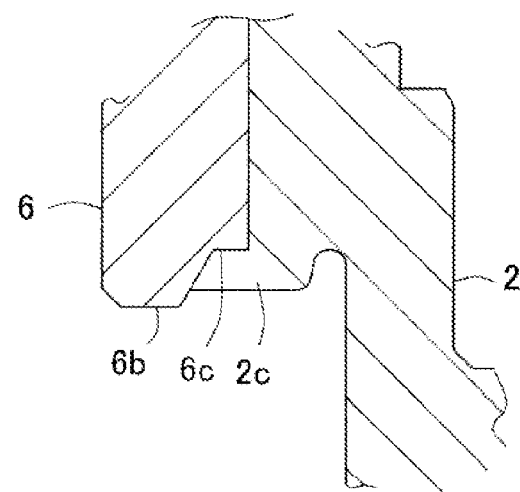
FIG. 2B is a partial sectional view of the retaining projection after caulking.
Figure 3A:
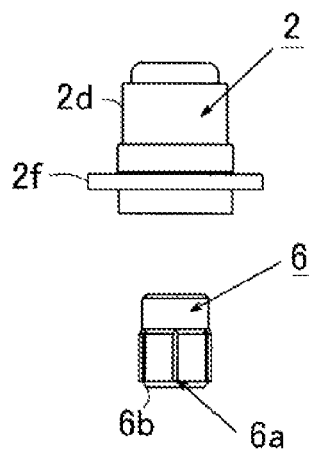
FIG. 3A is a front view of the bearing housing and the metallic bearing section disassembled.
Figure 3C:
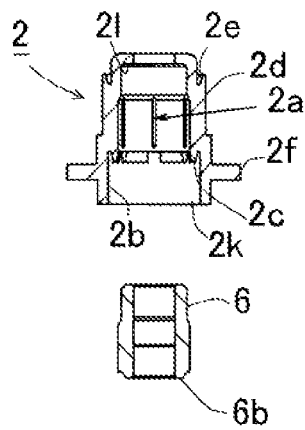
FIG. 3C is a sectional view of the bearing housing and the metallic bearing section disassembled taken along a line R-R.
Figure 3B:
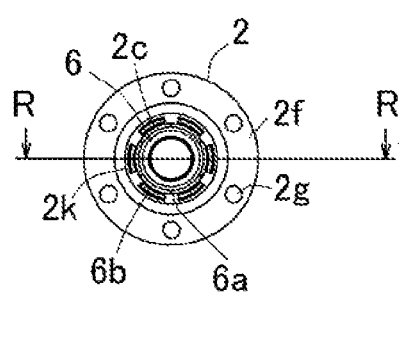
FIG. 3B is a bottom view of the bearing housing and the metallic bearing section disassembled.

As shown in FIGS. 1C, 1G and 3B, a plurality of retaining projections 2c (e.g., six retaining projections) are formed at one end of the housing hole located on the one end side of the bearing housing 2 and arranged in the circumferential direction. The retaining projections 2c are bent (deformed) to overlap an end face 6b of the bearing section 6 by heat caulking (see FIGS. 2A and 2B). Note that, the heat caulking is a caulking manner using any heating means, e.g., heat plate, ultrasonic wave means, infrared ray means, induction means, which is capable of generating heat and applying the heat to the bearing housing 2 made of resin, so that the retaining projections 2c can be deformed and the retaining projections 2c can be caulked. By heat-caulking the retaining projections 2c, the bearing section 6 made of metal can be retained in the bearing housing 2 made of resin without using an adhesive.

As shown in FIGS. 1B and 1D, a step-shaped part 2d is formed in the outer circumferential face of the bearing housing 2. A stator core 3a is attached to the step-shaped part 2d (see FIG. 4B). In FIG. 4B, the stator core 3a has a plurality of pole teeth 3b, which are radially formed and covered with an insulator 3c. A motor coil 3d is wound on each of the pole teeth 3b. Magnetic flux acting faces (outer faces) of the pole teeth 3b are opposed to the rotor magnet 8. Further, as shown in FIGS. 1A and 1D, a circular groove 2e is circularly formed, in an upper end part of the step-shaped part 2e, in the circumferential direction of the bearing housing 2.

As shown in FIGS. 1A-1C and 1G, a flange 2f is formed in the outer circumferential face of the bearing housing 2. Flange holes 2g are formed in the flange 2f. As shown in FIG. 4B, the other end side of the bearing housing 2 is fitted into a through-hole 10a of a casing 10 until the flange 2f contacts the casing 10, and screws or bosses are inserted into the flange holes 2g so as to assemble the blower to an external structure (not shown). A retaining washer 2h is fitted to an end part of the rotor shaft 5, which is fitted in the bearing section 6, and the shaft end is held by a thrust cover 2i, which is provided to the inner circumferential face 2b of the bearing housing 2. The thrust cover 2i has a thrust receiving member 2j made of, for example, polyether ether ketone (PEEK). A sensor 11 for detecting positions of magnetic poles of the rotor magnet 8 of the rotor 4 is provided to the casing 10.

Figure 3D:
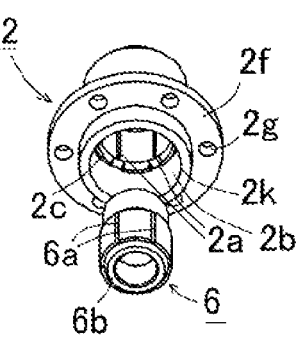
FIG. 3D is a perspective view of the bearing housing and the metallic bearing section disassembled.

Successively, a method of assembling the bearing unit 1 will be explained with reference to FIGS. 1A-3D. Firstly, as shown in FIGS. 3A and 3D, the grooves 6a and the projecting stripes 2a are correctly positioned to correspond to each other, and then the bearing section 6 is fitted into the bearing housing 2 from the opening part 2k. Further, the bearing section 6 is further fitted into the bearing housing 2, in the state where the grooves 6a and the projecting stripes 2a are engaged with each other, until the bearing section 6 contacts an inner end face 21 of the housing hole, which is formed at the other end of the housing hole of the bearing housing 2. The state of completely fitting the bearing section 6 in the bearing housing 2 is shown in FIG. 1D.

Next, the retaining projections 2c (see FIG. 2A) of the bearing housing 2, which are formed at the one end of the housing hole located on the one end side of the bearing housing 2, is deformed, by heat caulking, to overlap the end face 6b of the bearing section 6 and welded thereon. The state of heat-caulking the retaining projections 2c is shown in FIG. 2B. Note that, a step-shaped part 6c may be formed in the end face 6b of the bearing section 6 for heat-caulking the retaining projections 2c. In this case, the bearing section 6 can be retained in the bearing housing 2, and detachment of the bearing section 6 in the axial direction can be prevented.

In the motor of the present embodiment, as shown in FIG. 4B, the bearing unit 1 is attached to the casing 10 having the sensor 11, and the stator 3 and the rotor 4 are attached in order. The stator 3, in which the stator core 3a is covered with the insulator 3c and the motor coils 3d are respectively wound on the pole teeth 3b, is attached to the step-shaped part 2d of the bearing housing 2. The stator core 3a may be fixed by, for example, welding a part of the bearing housing 2 by heat caulking. The rotor 4, to which the impeller 9 has been attached, is assembled by the steps of: inserting the rotor shaft 5 in the bearing hole of the bearing section 6; fitting the retaining washer 2h; and fitting the thrust cover 2i on the inner circumferential face 2b of the bearing housing 2 so as to hold the shaft end of the rotor shaft 5 by the thrust receiving member 2j.

As described above, by employing the bearing housing 2 made of resin, production cost of the bearing unit 1 can be reduced. The bearing section 6 made of metal is fitted into the bearing housing 2 from the opening part 2k which is located on the one end side of the bearing housing 2, in the state where the grooves 6a and the projecting stripes 2a are corresponded to each other, until the bearing section 6 contacts the inner end face 21 of the housing hole. Therefore, the bearing section 6 can be attached to the bearing housing 2 in the state where the projecting stripes 2a engage with the grooves 6a, so that rotation of the bearing section 6 can be securely prohibited. Because the bearing section 6 can be attached to the bearing housing 2 without being press-fitted, an inner diameter of the bearing section 2 is not changed by distortion, so that the post-process of rotary sizing can be omitted.

Further, the retaining projections 2c of the bearing housing 2, which are formed at the one end of the housing hole located on the one end side of the bearing housing 2, are deformed to overlap the end face of the bearing section 6, so that the bearing section 6 can be retained and prohibited to move in the axial direction. Therefore, the metallic bearing section 6 can be easily and accurately assembled in the bearing housing 2 made of resin without deformation caused by heat and press fit.

In the motor, the stator core 3a is attached on the outer circumferential face of the bearing housing 2 and retained by heat caulking, and the rotor 4 having the rotor shaft 5, which is rotatably held by the bearing section 6 attached in the bearing housing 2, is rotatably held in the motor. With this structure, production cost of the motor can be reduced, and assembling efficiency of the motor can be improved.

In the above described embodiment, the projecting stripes 2a are formed in the inner circumferential face 2b of the bearing housing 2, and the grooves 6a are formed in the outer circumferential face of the bearing section 6. In the present invention, the grooves may be formed in the bearing housing 2, and the projecting stripes may be formed in the bearing section 6.

In the above described embodiment, the bearing section 6 fitted in the bearing housing 2 is the oil-impregnated sintered bearing, but other bearings, e.g., slide bearing, fluid dynamic bearing, air bearing, may be employed as the bearing section 6.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alternations could be made hereto without departing from the spirit and scope of the invention.

What is claimed is:

1. A bearing unit, comprising:
a bearing housing being formed into a cylindrical shape; and
a bearing section being attached in the bearing housing, the bearing housing being capable of rotatably holding a rotor shaft,
wherein the bearing housing is made of resin,
grooves and projecting stripes, which are engaged with each other, are formed in an inner circumferential face of a housing hole of the bearing housing and an outer circumferential face of the bearing section and extended in an axial direction of the bearing housing and the bearing section,
the bearing section is fitted into the bearing housing from an opening part which is located on one end side of the bearing housing, in a state where the grooves and the projecting stripes are corresponded to each other, until the bearing section contacts an inner end face of the housing hole which is located on the other end side of the bearing housing, and
a retaining projection of the bearing housing, which is formed at one end of the housing hole located on the one end side of the bearing housing, is deformed to overlap an end face of the bearing section.

2. The bearing unit according to claim 1,
wherein the retaining projection is deformed by heat caulking.

3. The bearing unit according to claim 1,
wherein the projecting stripes are formed in the inner circumferential face of the bearing housing and extended in the axial direction thereof, and
the grooves are formed in the outer circumferential face of the bearing section.

4. The bearing unit according to claim 3,
wherein number of the grooves, which are formed in the outer circumferential face of the bearing section, is larger than that of the projecting stripes, which are formed in the inner circumferential face of the bearing housing.

5. The bearing unit according to claim 1,
wherein the bearing section is made of metal.

6. A motor, comprising:
the bearing unit according to claim 1;
a stator core being attached on an outer circumferential face of the bearing housing; and
a rotor having a rotor shaft, which is rotatably held by the bearing section attached in the bearing housing.

7. A motor, comprising:
the bearing unit according to claim 2;
a stator core being attached on an outer circumferential face of the bearing housing; and
a rotor having a rotor shaft, which is rotatably held by the bearing section attached in the bearing housing.

* * * * *